United States Patent Office.

GIBSON SMITH, OF GROTON JUNCTION, MASSACHUSETTS.

Letters Patent No. 99,487, dated February 1, 1870.

IMPROVED COMPOUND FOR COLORING AND PRESERVING THE HAIR.

The Schedule referred to in these Letters Patent and making part of the same.

*To all whom it may concern:*

Be it known that I, GIBSON SMITH, of Groton Junction, in the county of Middlesex, and State of Massachusetts, have invented certain new and useful Improvements in Compounds for Coloring and Preserving Hair; and I do hereby declare that the following is a full, clear, and exact description thereof.

I obtained, on March 23, 1869, Letters Patent of the United States for an improved compound for coloring hair. Since the issue of said patent, I have discovered an important auxiliary to this compound, the effect of which is to render the hair, which is naturally harsh and wiry, at once soft and pliable.

To enable others skilled in the art to make my improved compound for the hair, I will now proceed to describe how the same should be made.

I use, by weight, one ounce of hyposulphite of soda, thirteen ounces of soft water, one ounce and a half of glycerine, and three ounces of rose-water.

The above-named ingredients should be thoroughly incorporated with each other, when the compound is ready for use.

I do not wish to confine myself simply to the proportions given above; but

What I claim, and desire to secure by Letters Patent, is—

The combination of hyposulphite of soda and glycerine, substantially for the purpose set forth.

In testimony that I claim the foregoing as my own, I affix my signature, in presence of two witnesses.

GIBSON SMITH.

Witnesses:
T. H. ALEXANDER,
JOHN A. ELLIS.